Jan. 15, 1952 L. I. MENDELSOHN 2,582,788
MAGNETIC SUSPENSION FOR HORIZONTAL SHAFTS
Filed Feb. 1, 1949 2 SHEETS—SHEET 1

Inventor:
Lewis I. Mendelsohn,
by Braxell & Mack
His Attorney.

Jan. 15, 1952 L. I. MENDELSOHN 2,582,788
MAGNETIC SUSPENSION FOR HORIZONTAL SHAFTS
Filed Feb. 1, 1949 2 SHEETS—SHEET 2
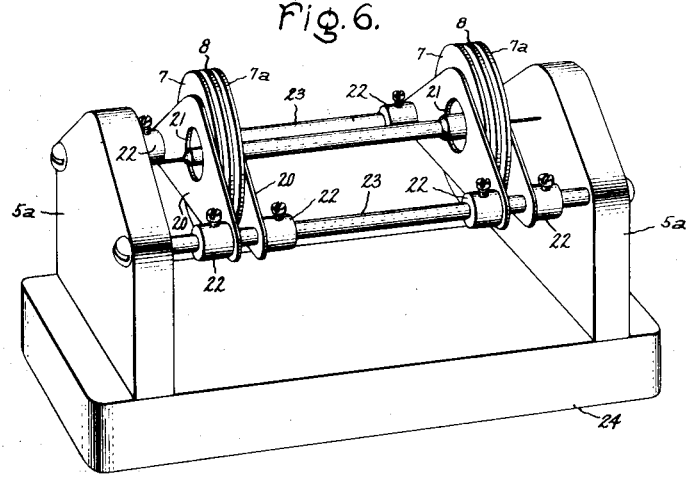
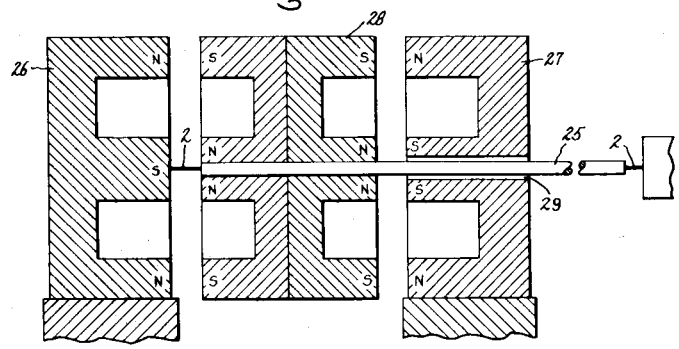
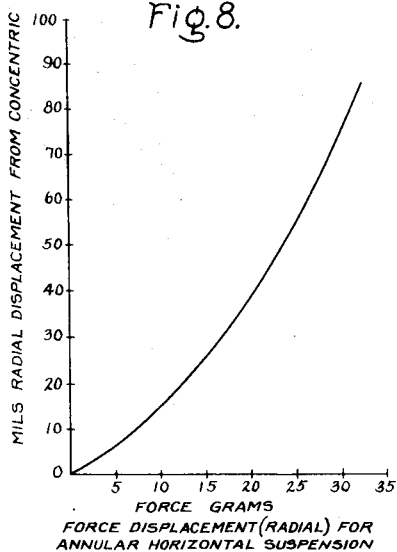
FORCE DISPLACEMENT (RADIAL) FOR
ANNULAR HORIZONTAL SUSPENSION
Inventor:
Lewis I. Mendelsohn,
by Prowell P. Mack
His Attorney.

Patented Jan. 15, 1952

2,582,788

UNITED STATES PATENT OFFICE 2,582,788

MAGNETIC SUSPENSION FOR HORIZONTAL SHAFTS

Lewis I. Mendelsohn, Lynn, Mass., assignor to General Electric Company, a corporation of New York Application February 1, 1949, Serial No. 73,892

6 Claims. (Cl. 308—1)

My invention relates to a magnetic suspension system for horizontal shafts which operates on the magnetic attraction principle, and its object is to provide a powerful vertical magnetic lifting force which is stable in the direction of lift and in all other directions at right angles to the axis of rotation. The suspension may be stabilized in an axial direction by means of thrust bearings, but the structure may be adjusted so that any horizontal thrust approaches a zero value. The invention is suitable for relieving horizontal shaft devices of the considerable bearing friction which is present in the commonly used conventional horizontal shaft bearing.

Figure 1:
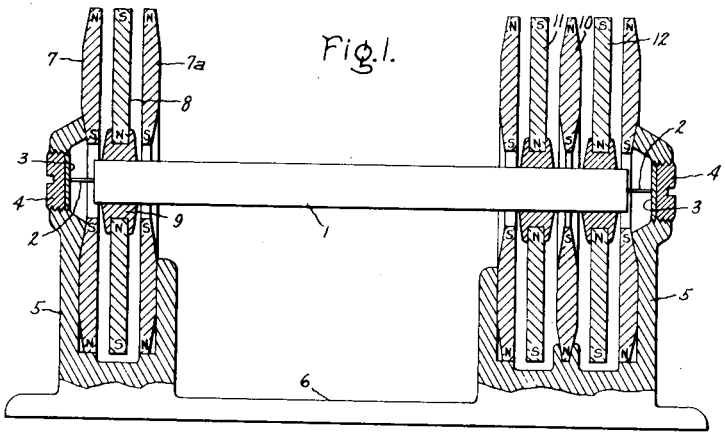
Figure 2:
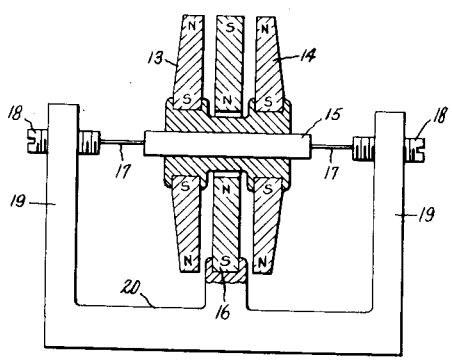
Figure 3:
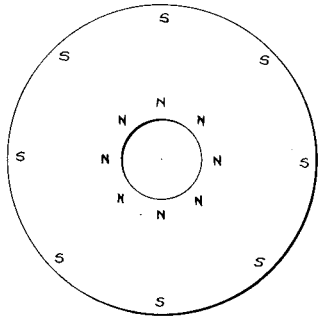
Figure 4:
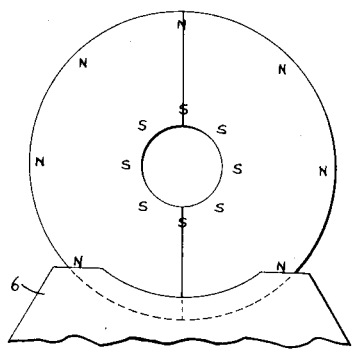
Figure 5:
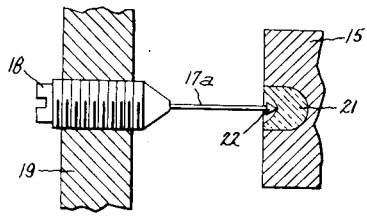

The features of my invention which are believed to be novel and patentable will be pointed out in the claims appended hereto. For a better understanding of my invention, reference is made in the following description to the accompanying drawing in which Fig. 1 shows a cross section through one of my horizontal shaft magnetic suspension bearing structures. Fig. 2 is a cross-sectional view through one of the horizontal shaft bearings adapted as a gyroscope device. Fig. 3 is a side view of one-piece disk permanent magnets of my suspension bearing, and Fig. 4 is a similar view of a divided disk permanent magnet disk for my suspension bearing. Fig. 5 illustrates a resiliently mounted jewel and pivot thrust bearing which may be used in my invention; Fig. 6 is a perspective side view of a bearing structure embodying my invention which allows for adjustment of the magnetic suspension force; Fig. 7 is a cross section of a suspension bearing for a relatively heavy rotor; and Fig. 8 is a curve showing the force displacement characteristics of the type of suspension described.

Referring now to Fig. 1, 1 represents a horizontally disposed shaft which is mounted for rotation and which will usually carry additional parts to be rotated therewith, which are not shown. The weight of such shaft and the weight of any additional parts that may be carried thereby are supported by my magnetic suspension bearing, one of each being illustrated at opposite ends of the shaft. The axial position of the shaft is adjustably determined by thrust bearings comprising center pins 2 fastened in and extending from either end of the shaft and lightly abutting against smooth vertical surface bearing plates 3 which are axially adjustable by reason of being mounted on the inner ends of adjusting set screws 4 threaded through the pedestals 5 of stationary supporting framework 6. These thrust bearing allow radial displacement of the shaft and serve only to prevent axial displacement.

The magnetic suspension bearing at the left comprises three washer-shaped permanent magnets which are radially polarized as indicated in Figs. 1, 3 and 4. Two of these magnets 7 and 7a are supported and fixed in place in axial alignment by the supporting structure 6 in spaced relation at right angles to, and approximately concentric with, the desired axial location of the shaft 1. The other permanent magnet 8 is mounted cencentrically on, and at right angles to, the shaft 1 midway between the stationary magnets 7 and 7a.

The radial polarization of magnet 8 is opposite to that of the stationary magnets 7 and 7a as indicated by the flux polarity designations. The three magnets may be made of flat-sided washer-shaped disks of exactly the same dimensions, but some improvement may be obtained by dimensioning the magnetic material used as hereinafter mentioned and as indicated in Fig. 1. The shaft 1, the supporting hub 9 of magnet 8, and the stationary supporting structure 3, 4, 5 and 6 will be made of any suitable material which is non-magnetic. The magnetic bearing structure shown at the right in Fig. 1 is of the same type as that at the left but has a double set of stationary and rotary magnets and can, accordingly, support a correspondingly greater weight for a given vertical displacement. The central stationary magnet 10 of the group at the right cooperates with both of the rotary magnets 11 and 12 on either side and thus has a double use and is, accordingly, made proportionately thicker and stronger magnetically than in the case of the outer stationary magnets. It will be evident that additional stationary and rotary magnets could be added to the group, and also that a magnetic bearing could consist of only one stationary and one rotary magnet. Thus, in Fig. 1, all magnets except the outer two magnets at each end of the shaft could be eliminated and those remaining would operate on the same principle as the larger groups of magnets so far as magnetic suspension of the horizontal shaft is concerned but with a correspondingly decreased lifting power.

The adjacent poles of opposite polarity of stationary and rotary magnets attract each other and hence tend to maintain the rotary magnets and shaft in concentric relation to the fixed magnets. Thus, the north poles at the outer periphery of stationary magnets 7 and 7a attract the adjacent south pole of magnet 8 and tend to center it. A similar centering action occurs between the south poles of the stationary magnets and the north pole of the rotary magnet at the inner periphery of the magnets. This centering action is opposed by gravity acting on the rotary parts, and as a result the rotary axis is slightly lower than the true axial center of the stationary magnets so that the attraction forces have vertical components. As this lowering of the rotary axis occurs, the lifting forces at the upper outer periphery and at the inner periphery of the magnets increase as the poles of opposite polarity at these points move farther apart vertically. Upon such downward movement of the rotary parts, all of the magnetic forces which have a vertical component become lifting forces on the rotary element, and the area of the magnets over which such lifting forces exist spreads.

Similar magnetic forces act to resist displacement of the rotary parts in any direction at right angles to the shaft. While it is not intended that the shaft shall be loaded to such an extent that the weight of the rotary parts shall be supported other than magnetically, the design is such that if excessive displacement does occur, the shaft 1 will come against the inner periphery of the stationary magnets as a mechanical bearing and prevent further displacement. Thus, within such limits, the rotary shaft assembly is supported magnetically and this support is stable in all directions at right angles to the axis of the shaft.

The magnetic suspension described is unstable in an axial direction. Thus, if the rotary magnets are not magnetically centered between the stationary magnets so that the axial magnetic forces are equal in opposite axial directions, the rotary magnets will tend to pull over sideways against the stronger of the adjacent stationary magnets, and to prevent this, I provide the thrust bearing members 2 and 3. By means of the adjusting nuts 4, the axial position of shaft 1 is adjusted until the magnetic forces or the magnetic forces and any additional axial forces that may be present, tending to move the shaft axially in opposite directions, are equally balanced and there is no end play in the shaft. When this adjustment is correct, the pins 2 will rest lightly against the bearing plates 3 with no end thrust in either direction and with only sufficient pressure to prevent axial displacement of the shaft. These bearings are the only mechanical bearings involved, and since they are essentially a point contact bearing on the axis of rotation and without load, the bearing friction is negligible. Since the bearing plates 3 are flat vertical surfaces, the shaft may adjust itself up and down to the magnetically stable suspended position without interfering with the function of these end positioning thrust bearings.

Fig. 2 represents a modification where a pair of rotary washer-shaped magnets 13 and 14 on a shaft assembly 15 not only constitute the rotary part of any magnetic suspension bearing but also constitute the rotor of a gyroscope device rotatively supported by such bearing. The driving force for such a gyroscope may comprise air jets directed against the peripheries of the magnets 13 and 14 in a tangential direction. The stationary portion of such magnetic suspension bearing is shown as comprising a single washer-shaped magnet 16 supported midway between the magnets 13 and 14. The point contact thrust bearings comprise pins 17 fixed in screws 18 adjustably threaded through the pedestals 19 of the stationary supporting structure 20. The pins 17 bear lightly against the flat end surfaces of the shaft structure 15.

In Fig. 2, the fixed and rotary magnets are made of the same internal and external diameters. Any radial displacement from a concentric arrangement will be opposed by attractive magnetic forces at all peripheries of the magnets in the line with such lateral displacement. Such displacement will be limited by the hub of the shaft structure bearing against the inner peripheral surface of stationary magnet 16. The magnetic lifting force of the magnetic suspension is intended to be sufficient to prevent such limiting displacement under normal operating conditions.

To permit ease in assembly of the magnetic bearing structures such as have been described, part or all of the washer-shaped magnets may be built in two half sections as represented in Fig. 4. Since these magnets are radially magnetized, no flux needs to cross such division lines so that the splitting of the magnets into sections is feasible from a magnetic and polarization standpoint. I prefer to make the rotary magnets in one piece as indicated in Fig. 3, and where necessary for assembly purposes the stationary magnets may be made in two halves as represented in Fig. 4, with the supporting structure 6 embracing both halves and securing them together and in place.

Fig. 5 represents a jewel and pivot thrust bearing that may be employed where the parts 15, 18 and 19 correspond to those described in Fig. 2. A jewel 21 is shown embedded in the center end of shaft 15. The pin 17a is secured in screw 18 and is flexible, and its bearing end is provided with a cone-shaped bearing pivot 22. The pin 17a will be positioned on the axis of rotation of shaft 15 as magnetically suspended, and the flexibility of pin 17a will accommodate any small radial displacements of the shaft without interfering with the endwise positioning function of such thrust bearing.

The radial force displacement characteristics of such magnetic suspensions are represented in the curve of Fig. 8 where the ordinates represent mils radial displacement from a concentric positioning of the stationary and rotary magnets, and the abscissa represents grams weight of the rotating assembly which will be supported magnetically at the various displacements. This curve is obtained from an assembly like those shown in Fig. 6 where the stationary and rotary magnets were flat-sided disks all alike and of the following dimensions: inside diameter 7/8 inch; outside diameter 1¼ inches; thickness 0.025 inch; and made of a copper nickel cobalt alloy, 50 per cent Cu; 21 per cent Ni; and 29 per cent Co, fully permanently magnetized and stabilized.

An assembly like that shown in Fig. 6 and having magnets like those last mentioned, and with other dimensions in like proportions, will have a rotor weight of 10 grams and a stable displacement of the rotor of 0.015 inch from the concentric relation relative to the stationary magnets. If the magnets are of uniform material and are round and symmetrical or in other words are radially magnetically symmetrical, such a suspension has no hysteresis or eddy current losses due to rotation since the disks may be visualized as producing flux fields which do not rotate with the moving magnet but remain fixed in space.

While the test data given were obtained using flat washer-shaped magnets, some improvement will be possible by shaping the magnetic circuit as represented in Figs. 1 and 2 where the stationary magnets, such as 7, 7a, 10, 10, etc. have been made slightly thicker at their mid-radial portions than at their inner and outer peripheries. This extra thickness accommodates the greater flux density occurring in the neutral region of the stationary magnets and improves the flux field pattern for the purposes of this invention. It is to be noted that the washer-shaped disk magnets provide an appreciable length of permanent magnet material between the north and south poles— a feature beneficial to permanent magnet structures generally regardless of the particular kind of permanent magnet material used.

The modifications already described are generally suitable for lightweight rotor assemblies, such as occur in many measuring instruments. A modification embodying my invention which is more suitable for heavier rotor assemblies is represented in Fig. 7. Here one end of the shaft 25 is supported by the magnetic suspension shown, consisting of stationary permanent magnets 26 and 27 and a rotary magnet 28 on shaft 25. The stationary magnets are circular with E-shaped cross section taken through their diameters, and the rotary magnet 28 is of a cross section shaped like two E's placed back to back and may conveniently be made by thus assembling two parts of E-shaped cross section. The two halves of the suspension here shown may be separated to the opposite ends of the shaft as no flux needs to cross the center dividing line. The central hub pole pieces will be of large diameter as compared to the rim thickness of the outer pole piece so as to equalize the pole piece area. It is to be noted that here again the desirable feature of having a considerable length of permanent magnet material between the pole pieces of a magnet is realized. The central pole piece surface of magnet 26 may serve as the axially positioning flat thrust bearing surface at the left end of the shaft. A hole 29 may be provided through the axis of magnet 27 to freely accommodate shaft 25 where, as here represented, the shaft is to extend to the right. While this permits radial movement of the rotor relative to the stationary magnets, it also limits such movement should it become excessive.

For a magnetic suspension as here dimensioned, an aluminum nickel chromium permanent magnet alloy, such as is described in Jonas Patent No. 2,295,082, September 8, 1942, will be satisfactory. While I have mentioned certain kinds of permanent magnet material that may be used, the invention is not limited in this respect. Generally, the most suitable material available for the shape of magnet employed should be used. In some instances, a sintered permanent magnetic material will be desirable, particularly in the rotor if it contributes to a reduction in rotor weight without sacrificing other desirable properties.

Fig. 6 shows a rotary shaft and magnetic suspension assembly employing my invention and having a magnetic suspension unit at opposite ends of the shaft, generally similar to the three magnetic suspension units shown at the left in Fig. 1. The stationary magnets 7 and 7a of these suspension units are secured at their outer side surfaces to nonmagnetic plates 20 having openings 21 for the shaft 1 and having bushings 22 to enable the stationary magnets to be supported on a pair of stationary rods 23 extending between the end thrust bearing pedestals 5a on a base 24. The rods 23 are placed a sufficient distance away from and parallel to the axis of rotation to avoid interference with any rotating part, and serve to position all of the stationary magnets in axial alignment concentric to a given center line parallel to the axis of rotation of the rotor assembly. The bushings 22 are each provided with a set-screw which when tightened fixes the axial positions of the stationary magnets. When the set-screws are loosened, the stationary magnets 7 and 7a may be individually adjusted toward and away from the adjacent rotary magnets 8, and hence, this arrangement serves as a means of adjustment not only for zero end thrust but also as regards the lifting power or stiffness of the suspension, and hence the vertical position of the axis of rotation for a given weight of rotor assembly. Thus, moving the stationary magnets 7 and 7a closer to their intermediate rotary magnets 8 increases the stiffness of the suspension because of the reduction in magnetic air gaps. The stationary magnets must of course be spaced a sufficient distance from the rotary magnets for clearance under all operating conditions.

Some vertical adjustment of one end of the rotary shaft relative to the other end is also possible with this modification since the stationary magnets are individually adjustable towards and away from their adjacent rotary magnets making it possible to have the suspension stiffer at one end than at the other.

There may be special cases where the magnetic suspension of this invention may be applied to vertical or inclined shafts, both for preventing radial displacement and for taking part or substantially all of the thrust off the lower thrust bearing due to the weight of the rotating parts. For example, in applicant's Fig. 6, assume that the structure is rotated 90 degrees so that the shaft is vertical and the magnets 7 are uppermost. If, now, the magnets 7a are removed entirely and the weight of the rotating assembly in a downward direction is made equal to the lifting magnetic force between the stationary magnets 7 and rotary magnet 8, the end thrust forces will cancel and we have a form of magnetic suspension for vertical shafts, the thrust bearings maintaining the rotor position in the exact vertical position where the opposing vertical forces are equal. At the same time, the remaining magnets of the structure will tend to prevent any radial displacement of the shaft. Again, one or both of the magnets 7a may be left in place in such a vertical shaft structure, but the rotor position adjusted axially upwardly relative to the stationary magnets until the rotor weight acting downwardly is substantially equal to the resultant magnetic lifting force.

What I claim as new and desire to secure by Letters Patent of the United States is:

1. A magnetic suspension unit for horizontal shafts including with the shaft to be supported, a permanent magnet of circular configuration secured concentrically to said shaft and designated as the shaft magnet, said permanent magnet being polarized in a radial direction so as to have its magnetic poles radially spaced apart concentrically with respect to the shaft, and a pair of stationary permanent magnets of circular configuration of approximately the same inner and outer diameter as the shaft magnet in axial alignment with each other and closely spaced from and on either side of said shaft magnet and radially permanently magnetized to provide magnetic poles adjacent the radially spaced magnetic poles of the shaft magnet but of opposite polarity thereto whereby attraction forces are produced between the stationary and shaft magnets tending to maintain them in a concentric relation, said shaft being otherwise free to move radially over a limited range, and means for maintaining said shaft in an axial position where the shaft magnet is magnetically centered between the stationary magnets such that the resultant endwise magnetic forces on said shaft magnet are negligible.

2. A magnetic suspension unit for horizontal shafts comprising three circular permanent magnets of approximately the same diameter, and of greater radial than axial dimensions, each of said magnets being radially polarized so as to have concentric magnetic poles of opposite polarity, said magnets being located in parallel planes and closely spaced and with the inner magnet radially polarized in the opposite direction with respect to the two outer magnets such that the magnetic attraction forces between them tend to maintain them in a concentric relation, supporting means for maintaining the two outer magnets in spaced axial alignment, supporting means for the inner magnet and thrust bearing means between said two supporting means for permitting relative rotation between the two outer magnets and the inner magnet and maintaining equal spacing between the two outer magnets and the inner magnet while permitting relative radial freedom of movement between the two outer magnets and the inner magnet.

3. A magnetic suspension unit for horizontal shafts comprising a plurality of circular washer-shaped permanent magnets all radially polarized, said magnets being contained in stationary and rotatable groups there being an even number of magnets in one group polarized in one radial direction and an odd number (including one) in the other group radially polarized in the opposite direction, said magnets being supported in closely spaced side-by-side parallel planes with the magnets of one group between the magnets of the other group, supporting structure for each group, all of the magnets in any group being secured together in axial alignment, and thrust bearing means between the supporting structures of the two groups for maintaining the axial spacing between the two groups of magnets such that the resultant axial magnetic force between the two groups of magnets is negligible, while permitting limited freedom of movement between the two groups of radial directions.

4. A magnetic suspension for horizontal shafts comprising a plurality of circular washer-shaped permanent magnets all of approximately the same inner diameter, part of said magnets being stationary and polarized in one radial direction and the remainder being rotatable and polarized in the opposite radial direction, said magnets being axially spaced close together in parallel planes with stationary and rotary magnets interspaced, at least a portion of said washer-shaped magnets being made slightly thicker in their midradial portions than at their inner and outer peripheries to enhance the magnetic suspension properties of such unit, supporting structures for the stationary and rotatable magnets, each of such supporting structures maintaining all of the magnets supported thereby when there is more than one in axial alignment, and thrust bearing means between said supporting structures for maintaining the relative axial positions of the stationary and rotatable magnets such as to prevent any appreciable resultant magnetic end thrust and at the same time allowing for limited freedom of relative radial movement between the stationary and rotatable magnets.

5. A magnetic suspension for horizontal shafts comprising a pair of circular stationary magnets of E-shaped cross section through their diameters, means for supporting said magnets in axially spaced alignment with their rim and hub extensions facing each other, said magnets being similarly radially polarized to have magnetic poles of the one polarity at their hub portions and of the opposite polarity at their rim sections, a rotary permanent magnet closely spaced between said stationary magnets, said rotary permanent magnet being circular and of approximately the same diameter as the stationary magnets and having rim and hub extensions facing in opposite axial directions toward the corresponding portions of the stationary magnets, said rotary magnet being radially polarized in the opposite radial direction to the stationary magnets, and thrust bearing means for said rotary magnet for maintaining the rotary magnet substantially equally spaced between the stationary magnets to minimize resultant magnetic end thrust, said thrust bearing means allowing for freedom of movement in radial directions between the stationary and rotary magnets.

6. In a magnetic suspension assembly for rotary shafts, a pair of substantially similar permanent magnets of circular configuration having a substantially greater radius than axial thickness, one magnet being stationary and the other rotatable, said magnets being radially polarized in opposite directions such that when in axial alignment their poles of opposite magnetic polarity are in axial alignment, said magnets being disposed in parallel planes in close proximity to each other such that the magnetic forces between them tend to maintain them in concentric relation, each of said magnets being substantially radially magnetically symmetrical, means opposing the axial magnetic force between said magnets, and thrust bearing means for providing a desired axial spacing between said magnets, said thrust bearing means permitting relative radial movements of said magnets.

LEWIS I. MENDELSOHN.

REFERENCES CITED

The following references are of record in the file of this patent:

UNITED STATES PATENTS

| Number | Name | Date |
|---|---|---|
| 588,666 | Stanley et al. | Aug. 24, 1897 |
| 658,814 | Stanley et al. | Oct. 2, 1900 |
| 1,782,519 | Sutton | Nov. 25, 1930 |